United States Patent
Welch

(10) Patent No.: US 11,234,364 B1
(45) Date of Patent: Feb. 1, 2022

(54) ANTI-SCALP ATTACHMENT FOR A WEED CUTTER

(71) Applicant: Brian Welch, Redgranite, WI (US)

(72) Inventor: Brian Welch, Redgranite, WI (US)

( * ) Notice: Subject to any disclaimer, the term of this patent is extended or adjusted under 35 U.S.C. 154(b) by 184 days.

(21) Appl. No.: 16/844,500

(22) Filed: Apr. 9, 2020

Related U.S. Application Data

(60) Provisional application No. 62/869,647, filed on Jul. 2, 2019.

(51) Int. Cl.
*A01D 34/416* (2006.01)
*A01D 34/90* (2006.01)

(52) U.S. Cl.
CPC .......... *A01D 34/4167* (2013.01); *A01D 34/90* (2013.01)

(58) Field of Classification Search
CPC .. A01D 34/4167; A01D 34/90; A01D 34/412; A01D 34/416; A01D 34/4165; A01D 34/46
USPC ........................... 30/275.4, 276, 347; 56/12.7
See application file for complete search history.

(56) References Cited

U.S. PATENT DOCUMENTS

| | | | | |
|---|---|---|---|---|
| 5,092,112 A | * | 3/1992 | Buckendorf, Jr. | A01D 34/4167 56/12.7 |
| 5,095,687 A | * | 3/1992 | Andrew | A01D 34/416 172/17 |
| 5,459,985 A | * | 10/1995 | Gedert | A01D 34/001 30/296.1 |
| 5,477,665 A | * | 12/1995 | Stout | A01D 34/001 56/16.7 |
| 5,836,142 A | * | 11/1998 | Maxwell | A01D 34/001 56/12.1 |
| 8,769,830 B1 | * | 7/2014 | Brown | A01D 34/90 30/276 |
| 2003/0005674 A1 | | 1/2003 | Powell | |
| 2008/0202088 A1 | * | 8/2008 | Angelle | A01D 34/82 56/12.7 |
| 2015/0181806 A1 | * | 7/2015 | Lim | A01D 34/81 30/286 |

* cited by examiner

*Primary Examiner* — Phong H Nguyen
(74) *Attorney, Agent, or Firm* — Donald J. Ersler

(57) ABSTRACT

An anti-scalp attachment for a weed and grass trimmer preferably includes a tube clamp, a height adjustment tube, an elbow member and a ground support member. The tube clamp preferably includes a two piece tube clamp and a pivot member. The pivot member is preferably secured to a bottom of a first clamp member. The height adjustment tube is retained in the pivot member. The elbow member includes a horizontal leg and a vertical leg. The horizontal and vertical legs include a plurality of adjustment holes. The ground support member preferably includes a ground tube, a contact support member and a tapping projection. The contact support member is attached to a bottom of the ground tube at one end. The tapping projection preferably extends upward from a top of the ground tube. A horizontal adjustment hole is formed in an opposing end of the ground tube.

17 Claims, 5 Drawing Sheets

ANTI-SCALP ATTACHMENT FOR A WEED CUTTER

CROSS-REFERENCE TO RELATED APPLICATIONS

This a nonprovisional patent application, which claims the benefit of provisional patent application No. 62/869,647 filed on Jul. 2, 2019.

BACKGROUND OF THE INVENTION

1. Field of the Invention

The present invention relates generally to lawn care and more specifically to an anti-scalp attachment for a weed and grass trimmer, which prevents an inexperienced lawn care worker from scalping grass with the weed and grass trimmer.

2. Discussion of the Prior Art

Patent no. 2003/0005674 to Powell discloses a support assembly guide for a weed and grass trimmer. However, the Powell invention does not include height adjustment. The Powell invention also does not allow tapping a bottom of the line reel to feed line from the weed and grass trimmer.

Accordingly, there is a clearly felt need in the art for an anti-scalp attachment for a weed and grass trimmer, which prevents an inexperienced lawn care worker from scalping grass with the weed and grass trimmer.

SUMMARY OF THE INVENTION

The present invention provides an anti-scalp attachment for a weed and grass trimmer, which prevents an inexperienced lawn care worker from scalping grass with the weed and grass trimmer. The anti-scalp attachment for a weed and grass trimmer (anti-scalp attachment) preferably includes a clamp member, a height adjustment tube, an elbow member and a ground support member. The clamp member preferably includes a tube clamp and a pivot member. The tube clamp preferably includes a first clamp member, a second clamp member and four fasteners. The pivot member is preferably secured to a bottom of the first clamp member. The pivot member preferably includes a yoke member and a tube member. The yoke member includes a base, a first leg and a second leg. The first and second legs extend from a bottom of the base and are spaced apart to form a pivot slot. The tube member includes a tongue member and a tube retention member. The tongue member extends from a top of the tube retention member. A thickness of the tongue member is sized to be received by the pivot slot. The tongue member is pivotally retained in the yoke member with a pivot fastener. A tube bore is formed in a bottom of the tube retention member. One end of the height adjustment tube is retained in the tube bore. A height adjustment hole is formed in an opposing end of the height adjustment tube.

The elbow member includes a horizontal leg and a vertical leg. An angle A between the horizontal leg and the vertical leg is preferably 60 degrees, but other angles may also be used. The horizontal leg includes a plurality of horizontal adjustment holes and the vertical leg includes a plurality of vertical adjustment holes. An inner perimeter of the height adjustment tube is preferably sized to receive an outer perimeter of the vertical leg. A vertical retention clip or the like is inserted through the height adjustment hole in the height adjustment tube and one of the plurality vertical adjustment holes in the vertical leg. The ground support member preferably includes a ground tube, a contact support member and a tapping projection. The contact support member is attached to a bottom of the ground tube at substantially one end. The contact support member may have any suitable shape or size. The one end of the ground tube is bent upward to prevent digging into the ground. The one end may be bent-up at any suitable angle or have any suitable length past the contact support member. The contact support member preferably includes a base and an upward angled peripheral wall to enable the weed and gas trimmer to glide across a grass surface. The tapping projection preferably extends upward from a top of the ground tube, inside a perimeter of the contact support member.

The tapping projection includes a tapping member and an adjustment threaded stud. The adjustment threaded stud is attached to a top of the ground tube. The tapping member includes a tapping plate and a tapping base. The tapping plate preferably has a convex shape to accommodate tapping at various angles. The tapping base extends from a bottom of the tapping plate. A threaded bore is formed in a bottom of the tapping base to threadably receive the threaded stud. A jam nut is threaded on to the threaded stud to secure an adjustment height of the tapping projection. A horizontal adjustment hole is formed in an opposing end of the ground tube. A horizontal retention clip or the like is inserted through the horizontal adjustment hole in the ground tube and one of the plurality horizontal adjustment holes in the horizontal leg.

In use, the handle clamp member is attached to a pole of a weed and grass trimmer. An angle of the weed and grass trimmer may be adjusted relative to the ground using the pivot member. A height of the weed and grass trimmer is adjusted by adjusting the height adjustment tube relative to the vertical leg of the elbow member. A position of the tapping member relative to a spool of the weed and grass trimmer may be adjusted by positioning the ground tube relative to the horizontal leg of the elbow member. A height of the tapping member may be adjusted relative to the spool of the of the weed and grass trimmer by rotation the tapping plate relative to the ground tube.

Accordingly, it is an object of the present invention to provide an anti-scalp attachment, which prevents an inexperienced lawn care worker from scalping grass with the weed and grass trimmer.

These and additional objects, advantages, features and benefits of the present invention will become apparent from the following specification.

DETAILED DESCRIPTION OF THE PREFERRED EMBODIMENTS

Figure 1A:
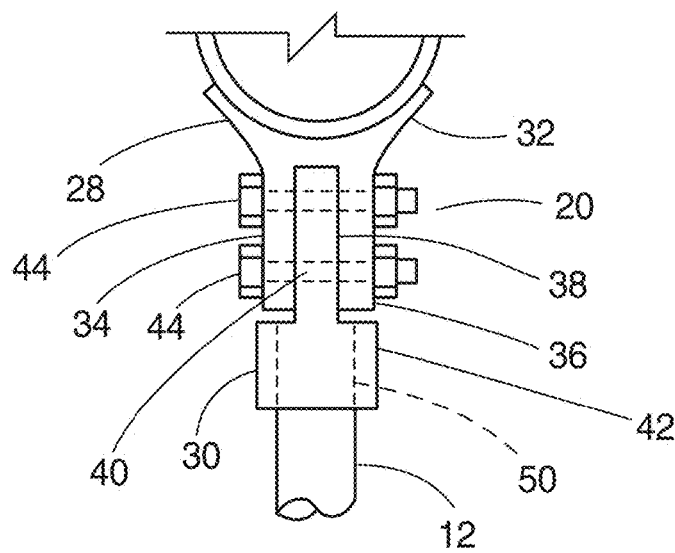
FIG. 1a is an enlarged end view of a pivot member of an anti-scalp attachment secured in accordance with the present invention.
Figure 1:
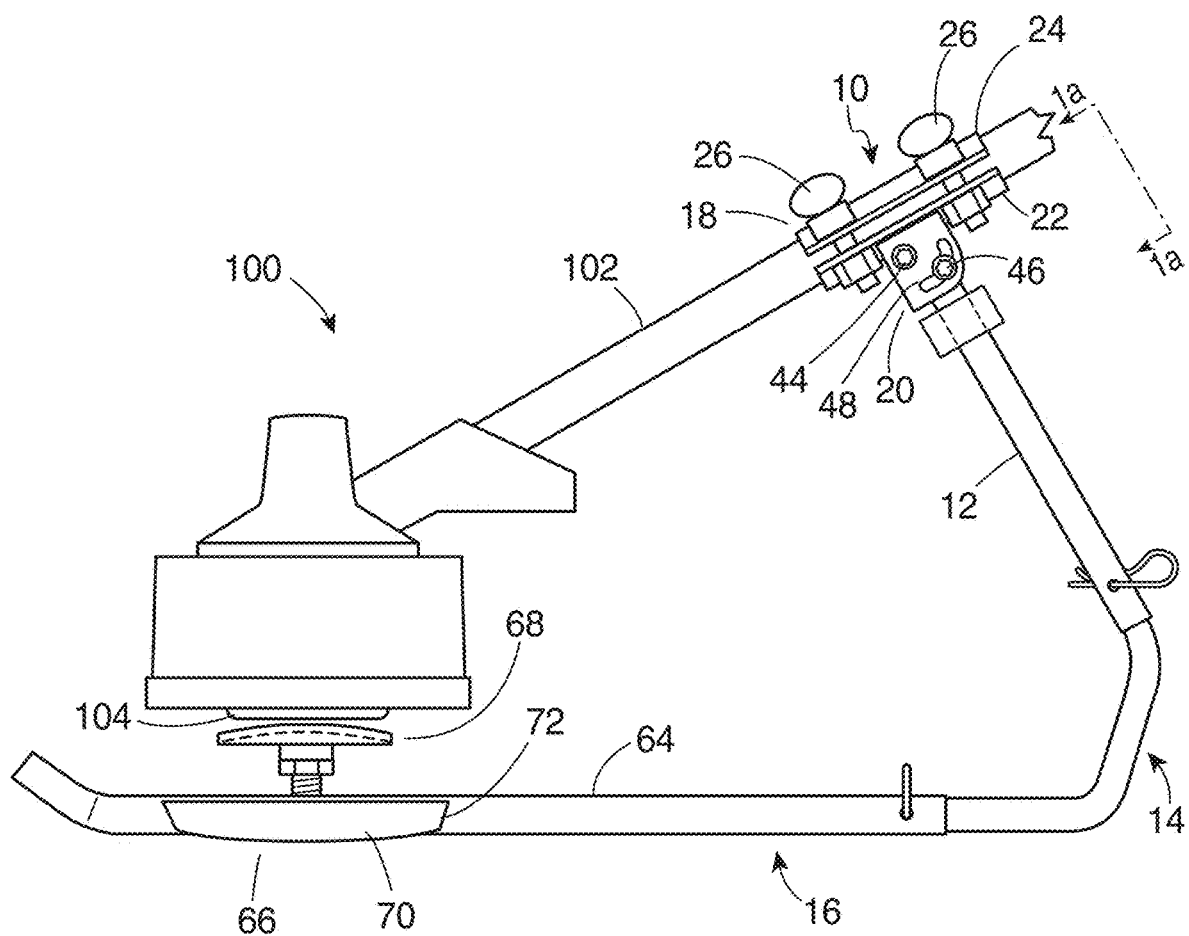
FIG. 1 is a side view of an anti-scalp attachment secured to a weed and grass trimmer in accordance with the present invention.
Figure 2:
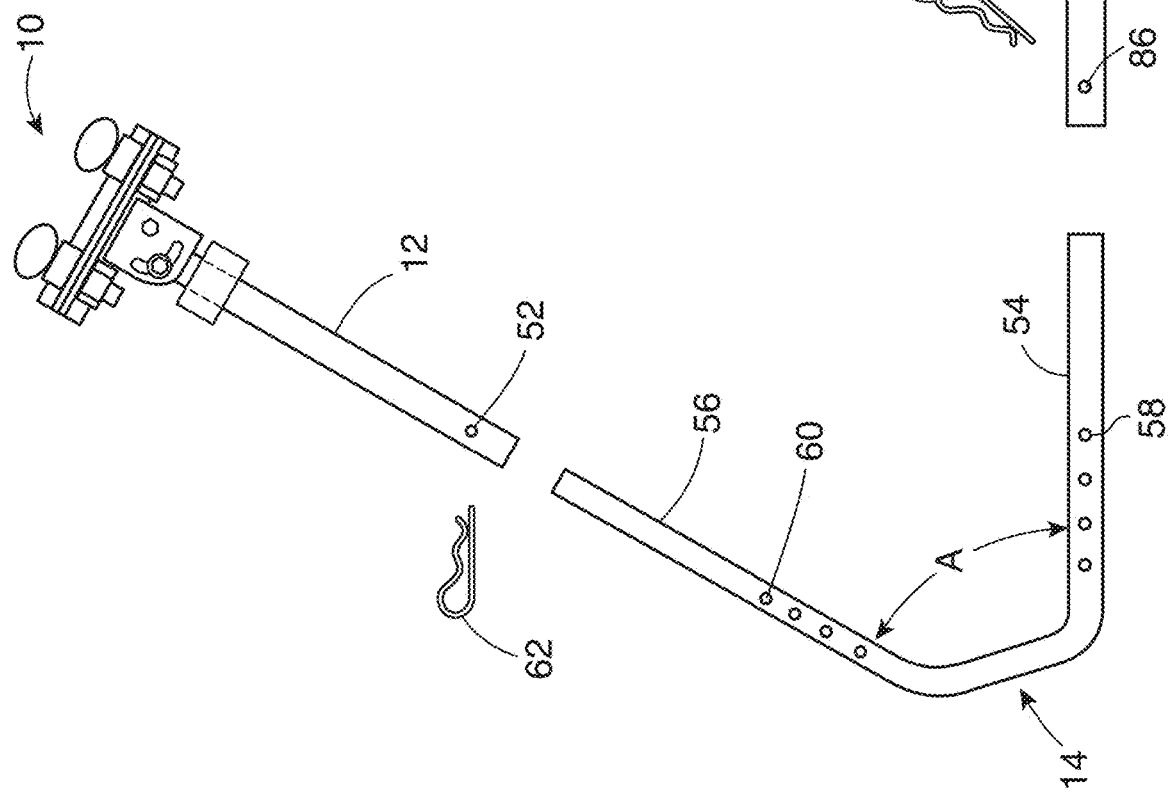
FIG. 2 is a partially exploded side view of an anti-scalp attachment in accordance with the present invention.
Figure 2:
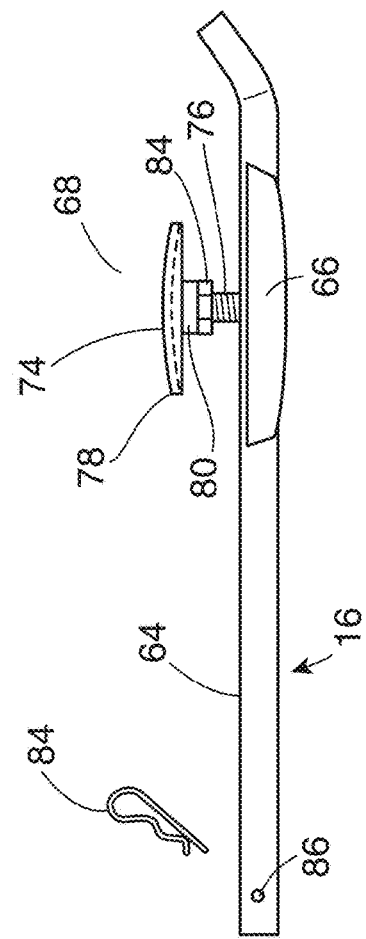
Figure 3:
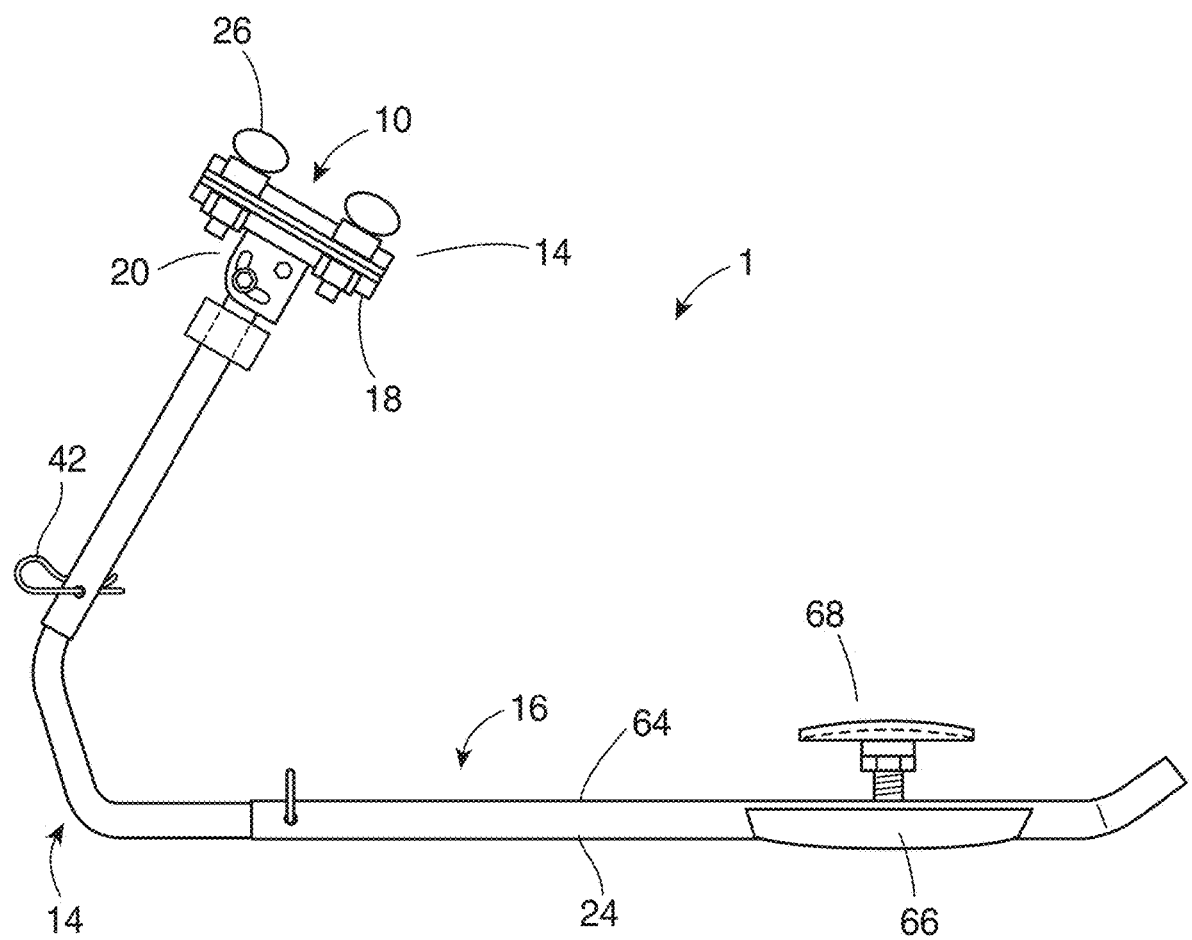
FIG. 3 is a side view of an anti-scalp attachment in accordance with the present invention.
Figure 4:
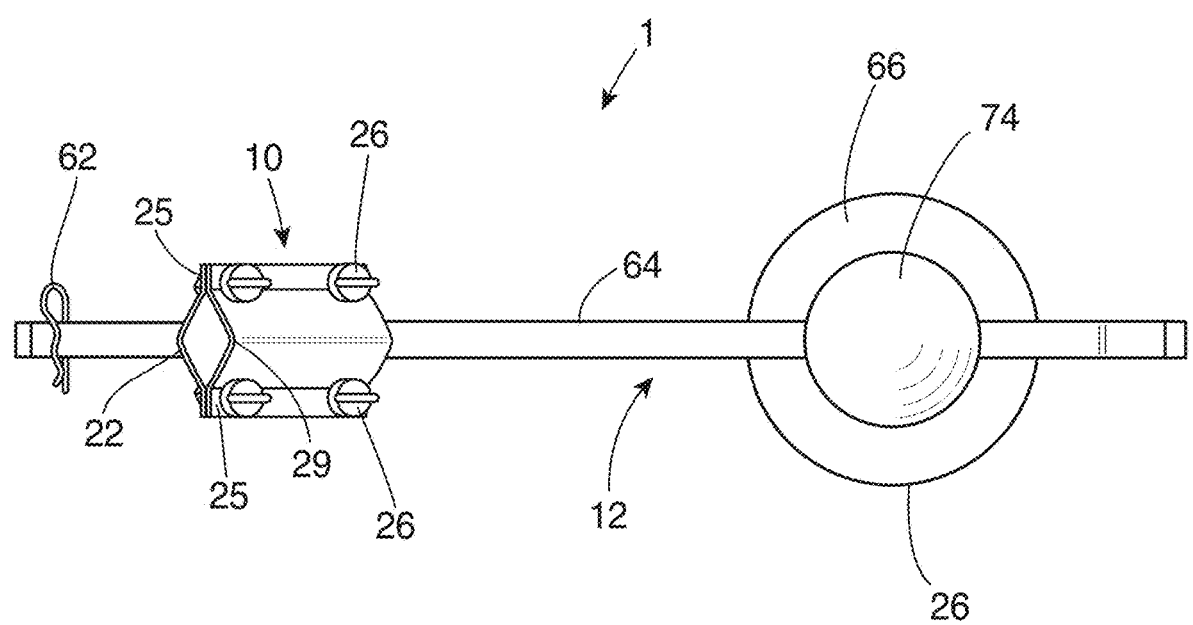
FIG. 4 is a top view of an anti-scalp attachment in accordance with the present invention.
Figure 5:
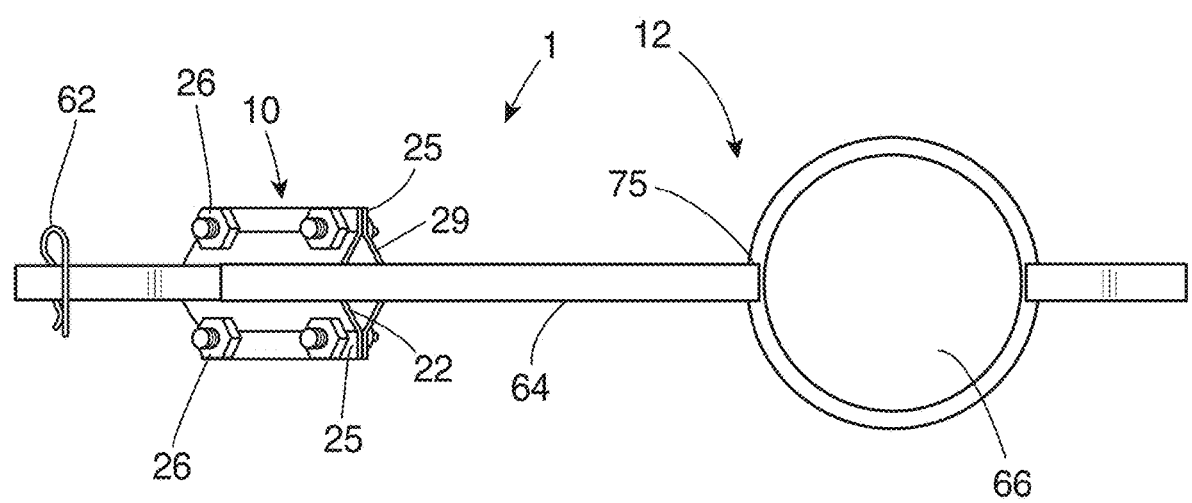
FIG. 5 is a bottom view of an anti-scalp attachment in accordance with the present invention.

With reference now to the drawings, and particularly to FIG. 1, there is shown a side view of an anti-scalp attachment 1 secured to a pole 102 of a weed and grass trimmer 100. The anti-scalp attachment 1 preferably includes a clamp member 10, a height adjustment tube 12, an elbow member 14 and a ground support member 16. The clamp member 10 preferably includes a tube clamp 18 and a pivot member 20. The tube clamp 18 preferably includes a first clamp member 22, a second clamp member 24 and four fasteners 26. However, any other suitable clamping device may also be used. The first and second clamp members 22, 24 include two fastener flanges 25 that extend outward from opposing sides of said first and second clamp 22, 24. A fastener hole is formed through each fastener flange 25 to receive one of the four fasteners 26. The pivot member 20 is preferably secured to a bottom of the first clamp member 22 with any suitable method. The pivot member 20 preferably includes a yoke member 28 and a tube member 30. The yoke member 28 includes a base 32, a first leg 34 and a second leg 36. The first and second legs 34, 36 extend from a bottom of the base 32 and are spaced apart to form a pivot slot 38. The tube member 30 includes a tongue member 38 and a tube retention member 42. The tongue member 40 extends from a top of the tube retention member 42. A thickness of the tongue member 40 is sized to be received by the pivot slot 38. The tongue member 40 is pivotally retained in the yoke member 28 with a pivot fastener 44. A position of the tube retention member 42 may be retained in place by tightening a retention fastener 46, which slides in a curved slot 48. A tube bore 50 is formed in a bottom of the tube retention member 42. One end of the height adjustment tube 12 is retained in the tube bore 50. With reference to FIG. 2, a height adjustment hole 52 is formed in an opposing end of the height adjustment tube 12.

The elbow member 14 includes a horizontal leg 54 and a vertical leg 56. An angle "A" between the horizontal leg 54 and the vertical leg 56 is preferably 60 degrees, but other angles may also be used. The horizontal leg 54 includes a plurality of horizontal adjustment holes 58 and the vertical leg 56 includes a plurality of vertical adjustment holes 60. An inner perimeter of the height adjustment tube 12 is sized to receive an outer perimeter of the vertical leg 56. A vertical retention clip 62 or the like is inserted through the height adjustment hole 52 in the height adjustment tube 12 and one of the plurality vertical adjustment holes 60 in the vertical leg 56.

The ground support member 16 preferably includes a ground tube 64, a contact support member 66 and a tapping projection 68. The contact support member 66 is attached to a bottom of the ground tube 64 at substantially one end. The contact support member 66 may have any suitable shape or size. The one end of the ground tube 64 is bent upward to prevent digging into the ground. The one end may be bent-up at any suitable angle or have any suitable length past the contact support member 66. The contact support member 66 preferably includes a contact base 70 and an upward angled peripheral wall 72 to enable the weed and gas trimmer 100 to glide across a grass surface. The contact base 70 is preferably curved to minimize contact with the grass surface. A pair of opposing notches 75 are formed in the angled peripheral wall 72 to provide clearance for the ground tube 64.

The tapping projection 68 preferably extends upward from a top of the ground tube 64, preferably inside a perimeter of the contact base 70. The tapping projection 68 preferably includes a tapping member 74 and an adjustment threaded stud 76. The adjustment threaded stud 76 is attached to a top of the ground tube 64. The tapping member 74 includes a tapping plate 78 and a tapping base 80. The tapping plate 78 preferably has a convex shape to accommodate tapping at various angles. The tapping base 80 extends from a bottom of the tapping plate 78. A threaded bore is formed in a bottom of the tapping base 80 to threadably receive the threaded stud 76. A jam nut 84 is threaded on to the threaded stud 76 to lock an adjustment height of the tapping projection 68. A horizontal adjustment hole 86 is formed in an opposing end of the ground tube 64. A horizontal retention clip 84 or the like is inserted through the horizontal adjustment hole 86 in the ground tube 64 and one of the plurality horizontal adjustment holes 58 in the horizontal leg 54.

In use, the tube clamp 10 is secured to a pole 102 of the weed and grass trimmer 100. An angle of the weed and grass trimmer 100 may be adjusted relative to the grass surface using the pivot member 20. A height of the weed and grass trimmer 100 is adjusted by adjusting the height adjustment tube 12 relative to the vertical leg 56 of the elbow member 14. A position of the tapping member 74 relative to a spool 104 of the weed and grass trimmer 100 may be adjusted by positioning the ground tube 64 relative to the horizontal leg 54 of the elbow member 14. A height of the tapping member 68 may be adjusted relative to the spool 104 of the of the weed and grass trimmer 100 by rotation of the tapping plate 78 relative to the ground tube 64. The jam nut 84 is tightened against the tapping base 80 to fix a height of the tapping plate 78.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An anti-scalp attachment for a weed and grass trimmer comprising:
   a clamp member for retaining a pole of the weed and grass trimmer;
   a height adjustment tube extends from a bottom of said clamp member;
   an elbow member includes a horizontal leg and a vertical leg, said vertical leg is sized to receive said height adjustment tube, said height adjustment tube is capable of being retained at different heights relative to said vertical leg; and
   a ground support member includes a ground tube and a tapping projection, said tapping projection extends upward from one end of said ground tube, said horizontal leg is sized to receive an opposing end of said ground tube.

2. The anti-scalp attachment for a weed and grass trimmer of claim 1 wherein:
   said clamp member includes a first clamp member, a second clamp member and four fasteners.

3. The anti-scalp attachment for a weed and grass trimmer of claim 1 wherein:
   a bent end extends upward from said one end of said ground tube.

4. The anti-scalp attachment for a weed and grass trimmer of claim 1 wherein:

said tapping projection includes a tapping member and a threaded stud, said threaded stud is attached to a top of said ground tube, said threaded stud is threadably engaged with said tapping member.

5. The anti-scalp attachment for a weed and grass trimmer of claim 4 wherein:

said tapping member includes a convex shape formed on a top thereof.

6. An anti-scalp attachment for a weed and grass trimmer comprising:

a clamp member includes a tube clamp and a pivot member, said pivot member extends from a bottom of said tube clamp, wherein the weed and grass trimmer is retained in said tube clamp;

a height adjustment tube extends from a bottom of said pivot member;

an elbow member includes a horizontal leg and a vertical leg, said vertical leg is sized to receive said height adjustment tube; and a ground support member includes a ground tube and a tapping projection, said tapping projection extends upward from one end of said ground tube, said horizontal leg is sized to receive an opposing end of said ground tube.

7. The anti-scalp attachment for a weed and grass trimmer of claim 6 wherein:

said tube clamp includes a first clamp member, a second clamp member and four fasteners.

8. The anti-scalp attachment for a weed and grass trimmer of claim 6 wherein:

a bent end extends upward from said one end of said ground tube.

9. The anti-scalp attachment for a weed and grass trimmer of claim 6 wherein:

said tapping projection includes a tapping member and a threaded stud, said threaded stud is attached to a top of said ground tube, said threaded stud is threadably engaged with said tapping member.

10. The anti-scalp attachment for a weed and grass trimmer of claim 9 wherein:

said tapping member includes a convex shape formed on a top thereof.

11. The anti-scalp attachment for a weed and grass trimmer of claim 6 wherein:

said pivot member includes a yoke member and a tube member, said tube member is pivotally engaged with said yoke member, said height adjustment tube is retained in a bottom of said tube member.

12. An anti-scalp attachment for a weed and grass trimmer comprising:

a clamp member includes a tube clamp and a pivot member, said pivot member extends from a bottom of said tube clamp, wherein the weed and grass trimmer is retained in said tube clamp;

a height adjustment tube extends from a bottom of said pivot member;

an elbow member includes a horizontal leg and a vertical leg, said vertical leg is sized to receive said height adjustment tube, said height adjustment tube is capable of being retained at different heights relative to said vertical leg; and a ground support member includes a ground tube, a contact support member and a tapping projection, said tapping projection extends upward from one end of said ground tube, said horizontal leg is sized to receive an opposing end of said ground tube, said contact support member extends below said ground tube under said tapping projection.

13. The anti-scalp attachment for a weed and grass trimmer of claim 12 wherein:

said tube clamp includes a first clamp member, a second clamp member and four fasteners.

14. The anti-scalp attachment for a weed and grass trimmer of claim 12 wherein:

a bent end extends upward from said one end of said ground tube.

15. The anti-scalp attachment for a weed and grass trimmer of claim 12 wherein:

said tapping projection includes a tapping member and a threaded stud, said threaded stud is attached to a top of said ground tube, said threaded stud is threadably engaged with tapping member.

16. The anti-scalp attachment for a weed and grass trimmer of claim 15 wherein:

said tapping member includes a convex shape formed on a top thereof.

17. The anti-scalp attachment for a weed and grass trimmer of claim 12 wherein:

said pivot member includes a yoke member and a tube member, said tube member is pivotally engaged with said yoke member, said height adjustment tube is retained in a bottom of said tube member.

* * * * *